March 29, 1927.

R. B. LEWIS

HARDNESS TESTING MACHINE

Filed Dec. 22, 1922   6 Sheets-Sheet 1

1,622,455

Inventor—
Robert B. Lewis
by his Attorneys
Howson & Howson

March 29, 1927.

R. B. LEWIS 1,622,455

HARDNESS TESTING MACHINE

Filed Dec. 22, 1922      6 Sheets-Sheet 2

Inventor.—
Robert B. Lewis.
by his Attorneys.
Howson & Howson

March 29, 1927.  1,622,455
R. B. LEWIS
HARDNESS TESTING MACHINE
Filed Dec. 22, 1922  6 Sheets-Sheet 3

Inventor—
Robert B. Lewis.
by his Attorneys—
Howson & Howson

March 29, 1927. 1,622,455
R. B. LEWIS
HARDNESS TESTING MACHINE
Filed Dec. 22, 1922   6 Sheets-Sheet 4

Inventor -
Robert B. Lewis.
By his Attorneys.
Howson & Howson

March 29, 1927.
R. B. LEWIS
1,622,455
HARDNESS TESTING MACHINE
Filed Dec. 22, 1922  6 Sheets-Sheet 5
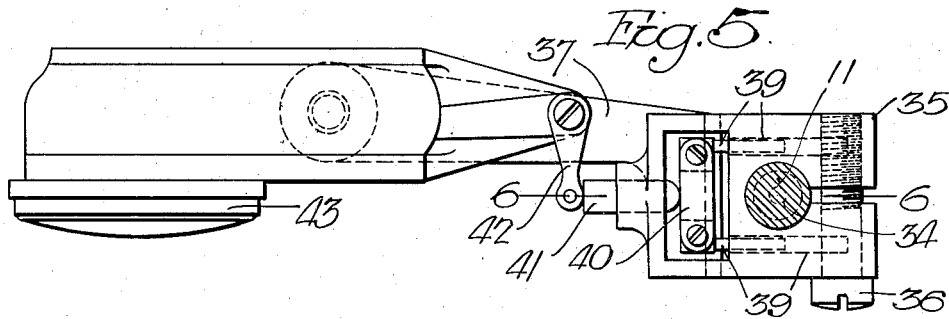
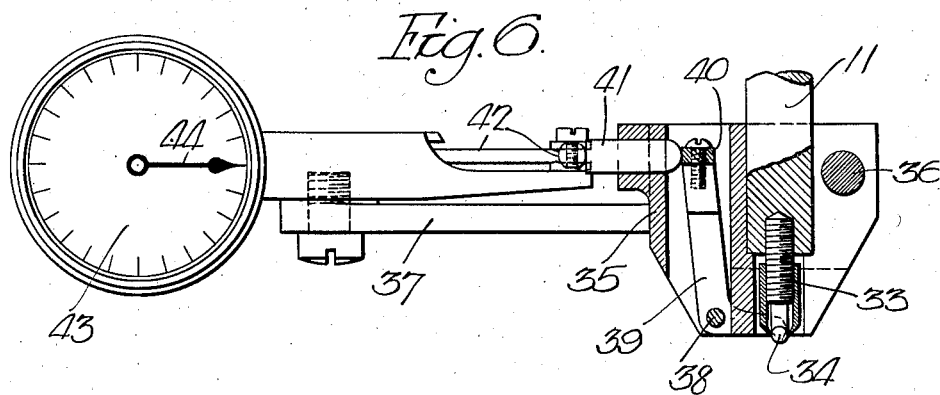
Inventor.—
Robert B. Lewis.
by his Attorneys.—
Howson & Howson March 29, 1927.

R. B. LEWIS 1,622,455

HARDNESS TESTING MACHINE

Filed Dec. 22, 1922    6 Sheets-Sheet 6

Inventor:
Robert B. Lewis,
by his Attorneys.
Howson & Howson

Patented Mar. 29, 1927.

1,622,455

UNITED STATES PATENT OFFICE.

ROBERT B. LEWIS, OF PHILADELPHIA, PENNSYLVANIA, ASSIGNOR TO TINIUS OLSEN TESTING MACHINE COMPANY, OF PHILADELPHIA, PENNSYLVANIA, A CORPORATION OF PENNSYLVANIA.

HARDNESS-TESTING MACHINE.

Application filed December 22, 1922. Serial No. 608,539.

One object of this invention is to provide a machine for testing the hardness of materials so as to obtain hardness readings by direct indications at the time the test is made.

A further object of the invention is to provide a simple and convenient machine whereby material in relatively thin sheets may be tested to determine its hardness as accurately as thicker sheets are at present tested in the standard type Brinell machine.

These objects and other advantageous ends I attain as hereinafter set forth, reference being had to the accompanying drawings, in which, Figs. 1 and 2 are respectively a side and a front elevation of a hardness testing machine constructed in accordance with my invention;

Figs. 5 and 6 are respectively a plan and an elevation partly in vertical section on the line 6—6, Fig. 5, illustrating on an enlarged scale the detail construction of the preferred form of indicating instrument used with and forming part of my invention;

Figure 1:
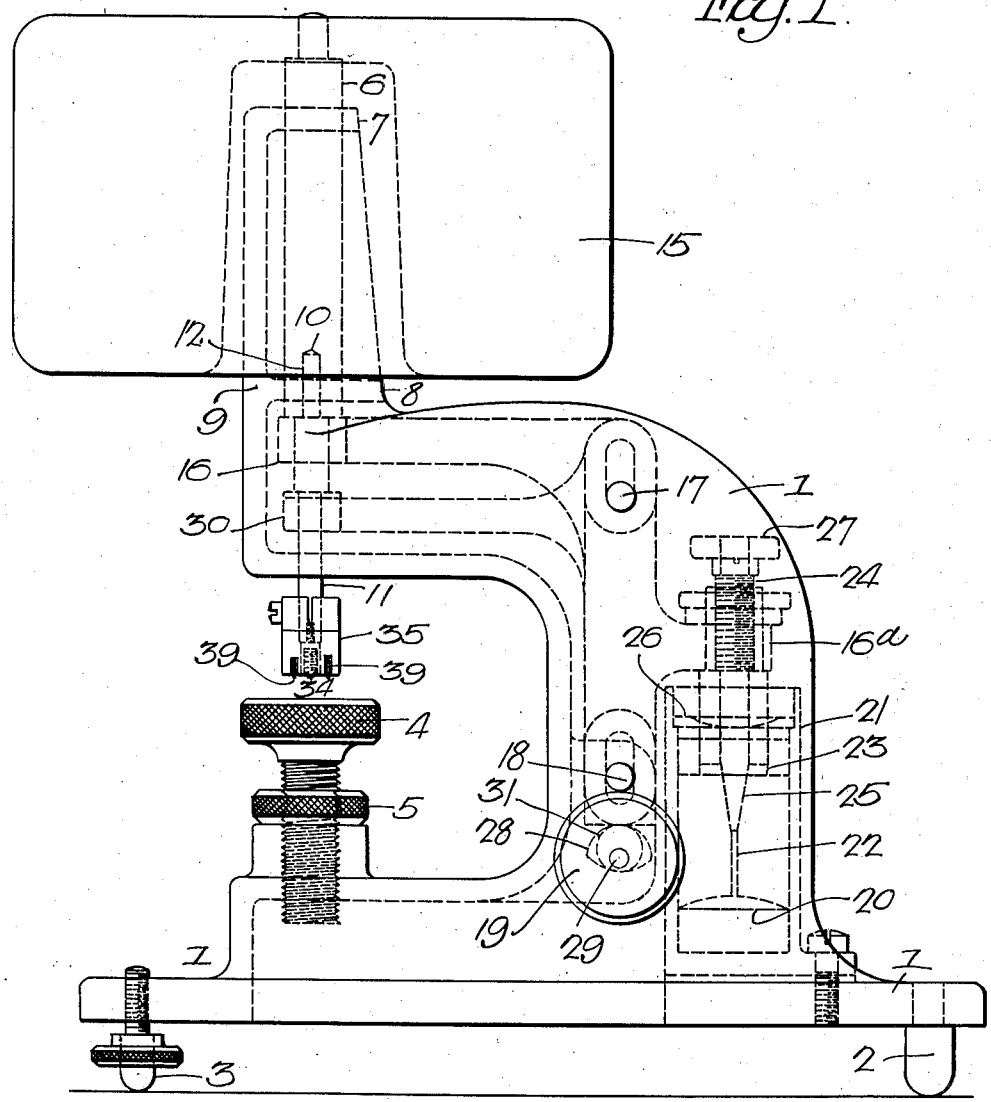
Figure 2:
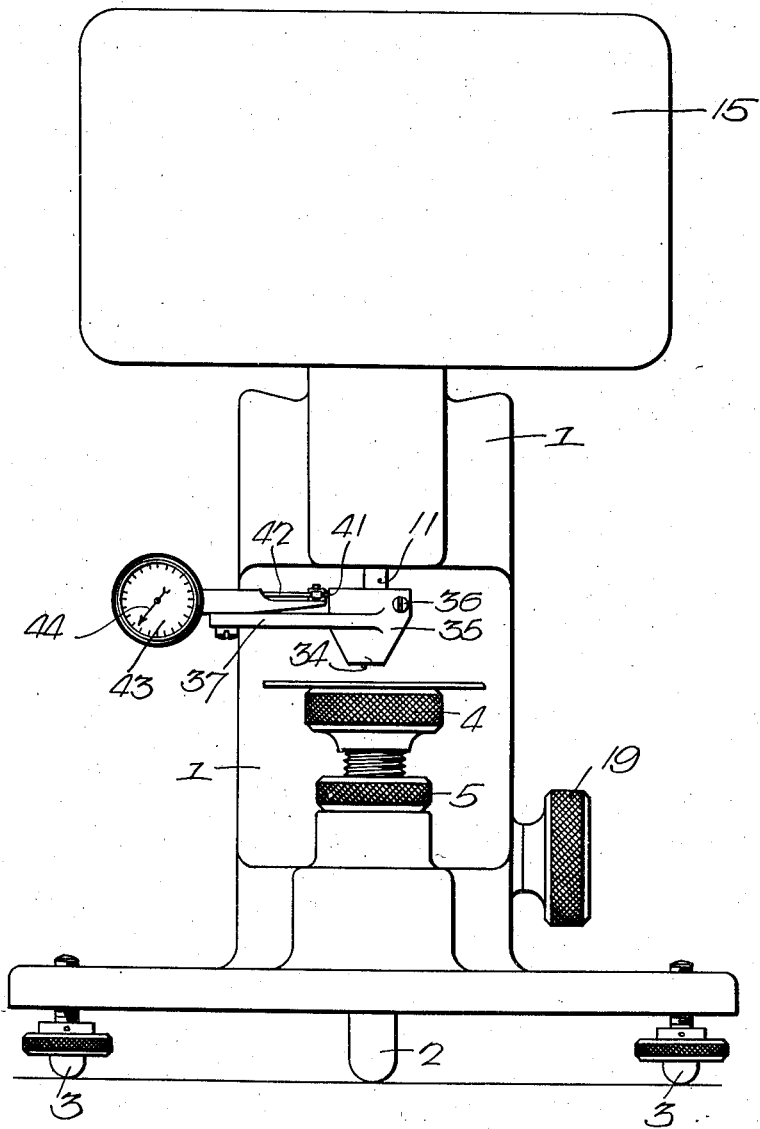
Figure 3:
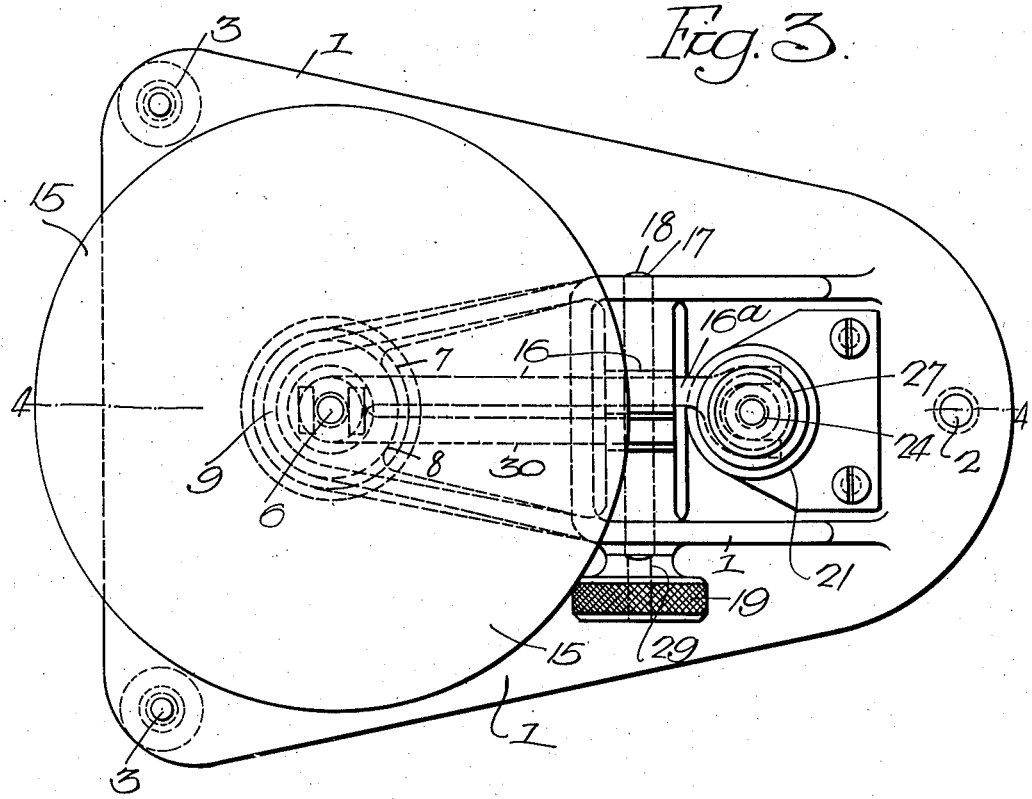
Fig. 3 is a plan of the machine shown in Figs. 1 and 2.
Figure 4:
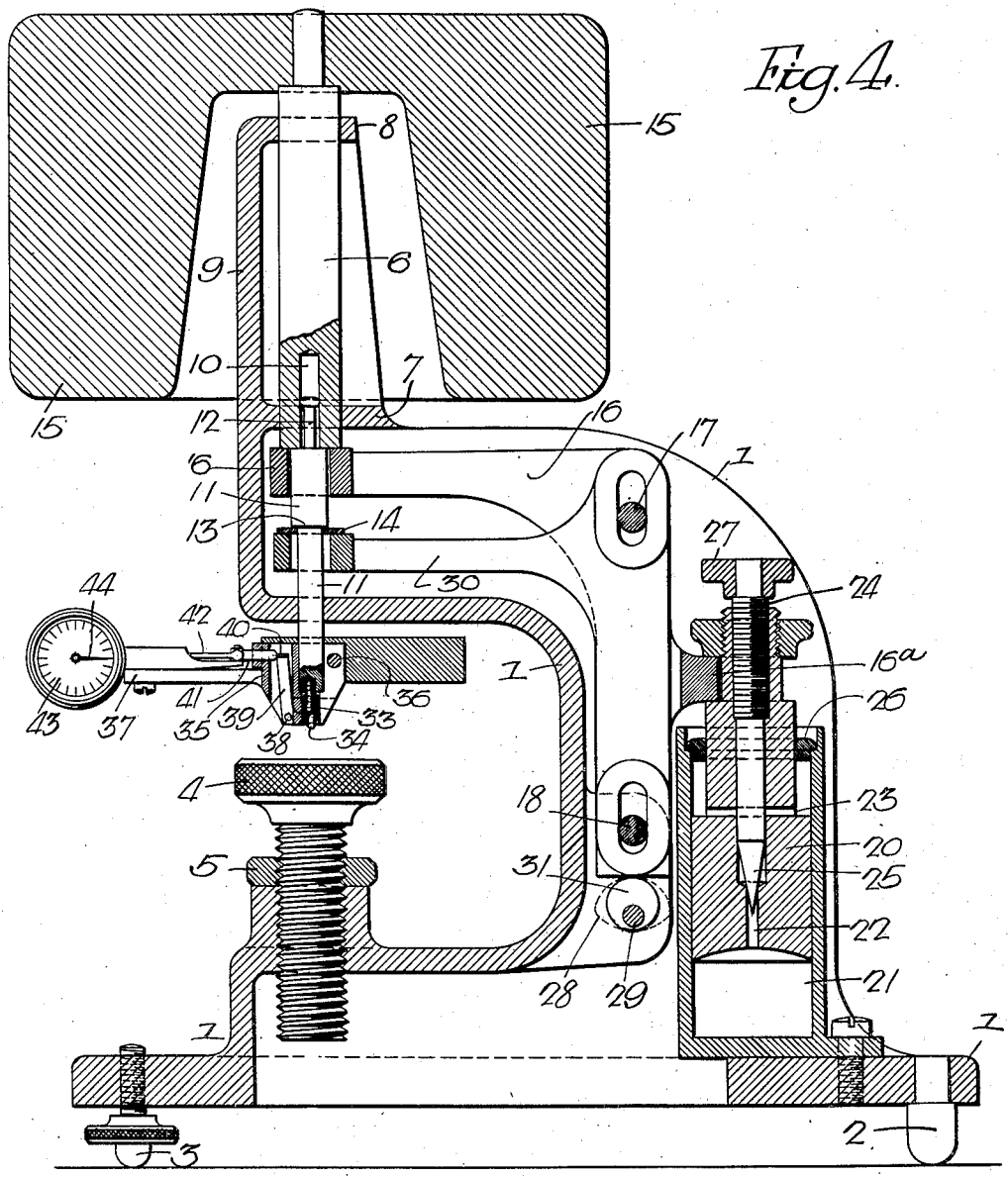
Fig. 4 is a vertical section on the line 4—4, Fig. 3, the indicating attachment being shown as swung through an angle of ninety degrees from the position in which it is illustrated in Fig. 2.

In the above drawings, 1 represents a suitable frame, in the present instance a casting, carried upon a fixed foot 2 and two adjustable feet 3. This frame may be described as substantially U-shaped in outline, having its sides or branches substantially horizontal. In what may be considered the lower branch of the frame is mounted an anvil 4 in the form of a stem threaded into said frame and having a head or flange with a plane, horizontal upper face for the reception of the sheet or body, the hardness of which is to be tested. The edges of the head are preferably milled to facilitate its adjustment in the frame and on its stem is mounted a jam nut 5 for immovably holding it in any given position.

Mounted in the upper branch of the frame, so as to be vertically slidable therein, are two axially aligned plungers 6 and 11 of which the upper is shown in the present instance as a substantially cylindrical rod vertically slidable in two bearings 7 and 8 of an extension 9 from the upper branch of the frame. The lower end of this plunger 6 is engaged by the body of the lower plunger 11 and has an axially extending cavity 10 in which is vertically guided an extension end 12 from said lower plunger.

The lower end of the plunger 11 is slidably guided in the upper branch of the frame 1 and in the present instance has a diameter less than that of its body to provide a shoulder 13 against which abuts a collar or washer 14. The upper end of the plunger 6 projects above the top bearing 8 and has symmetrically mounted upon it a relatively heavy weight 15. This weight-carrying plunger 6 rests upon and in this form of my invention is normally supported by a laterally projecting arm of an angle member 16, which has a vertically extending part formed with two vertically elongated slots for the reception of a pair of horizontal guide pins 17 and 18 mounted in the frame 1.

The lower end of this vertically extending part of the angle member 16 rests upon and is normally supported by a cam 28 fixed on a short horizontal spindle 29 rotatably mounted in the frame 1 adjacent its lower branch and having a milled head 19 to permit of its convenient adjustment by hand. The angle member 16 has also a second arm 16ª engaging a plunger or piston 20 operative in a cylinder 21 vertically mounted on the frame 1. This plunger has an axially extending passage 22 leading from its lower face to one or more laterally projecting passages 23 opening on its upper face. The upper end of said plunger is vertically extended and has threaded into it the stem 24 of a needle valve 25 whereby it is possible to accurately control the flow of a suitable liquid from the lower end of the cylinder through the passages 22 and 23 to the upper end thereof. The upper end of the cylinder is normally closed by a cover or packing ring 26 through which its extension is freely movable.

A suitable liquid such as oil or glycerine is placed in the lower part of the cylinder 21 and it is obvious that the rate at which the plunger may move downwardly in said cylinder under the action of the weight 15 on the angle member 16 may be governed by suitable adjustment of the needle valve, the upper end of whose stem has a milled head 27 to permit of its convenient rotation.

Also guided by the pins 17 and 18 is a second angle member 30 likewise having a vertical part provided with slots for said pins. From the upper end of this second angle member projects an arm which is forked at its outer end for the reception of the plunger 11 and this arm is so positioned as to extend immediately under the washer 14. The lower end of the vertical portion of this angle member 30 is designed to normally rest upon a second cam 31 on the shaft 29. Said cam 31 however, is so formed that a ninety degree rotation of the spindle 29 will now permit the angle member 30 to drop to a maximum extent. The cam 28 is so positioned that under these conditions it still supports the angle member 16 with the weight 15 in the fully elevated position, although a further ninety degree rotation of the spindle 29 in the same direction will withdraw the cam 28 from under the lower end of the angle member 16, allowing it with the weight 15 to fall, the arm 30 remaining in its lowest position.

The lower end of the plunger 11 has mounted in it a chuck or holder 33 having projecting from its lower end a hardened steel ball 34 designed to be pressed by the action of the weight 15 into a sheet to be tested. In order to measure the depth of the indentation made by the ball under the conditions of test, I clamp to the lower end of the plunger 11 an indicating device such as the instrument illustrated in detail in Figs. 5 and 6. This consists of a split clamping head 35 which may be caused to grip the lower end of the plunger by setting up a clamping screw 36, and it has projecting laterally from it an arm 37. The body of said head is chambered and has extending horizontally through its lower portion a pivot pin 38 serving as the fulcrum for a pair of bell crank levers 39 so mounted that each of them has a horizontally extended arm formed with a straight lower edge positioned to rest upon the flat top surface of the plate under test.

The second arms of these two levers extend upwardly and their upper ends are united by a horizontally extending member 40 resting against one end of a rod 41 slidably guided in the head 35. The opposite end of this rod engages the actuating arm 42 of any suitable form of instrument whose detail construction forms no part of the present invention, but which is equipped with a dial 43 and an indicating needle 44 operatively connected to said arm 42; the arrangement being such that said needle will accurately indicate in any suitable units the movement of the arm 42 under the action of the rod 41. In the present instance the dial 43 is adjustable relatively to the needle 44 so that the latter may be set to read zero when the horizontal arms of the levers 39 occupy any definite position.

Under conditions of use, the head 19 is turned so that the cams 28 and 31 raise their respective angle members 16 and 30. A plate or sheet whose hardness is to be tested is now placed on the flat upper face of the anvil 4, which is adjusted so that said plate may be engaged by the ball 34 under conditions of operation. The handle or head 19 is now given a ninety degree turn which permits the angle member 30 and with it the plunger 11 to descend while keeping the plunger 6 and the weight in an elevated position. The ball 34 thereupon engages and rests upon the upper surface of the plate to be tested, as do also the horizontal arms of the levers 39, after which the indicator is set to zero. Thereupon the handle 19 is given a further turn of ninety degrees, which releases the angle member 16 and allows the plunger 6 with the weight 15 to descend under the control of the dash pot. Said plunger 6 ultimately comes into engagement with the upper end of the body of the plunger 11 so that the ball 34 is caused to penetrate to a greater or less depth into the specimen under test. The needle 44 of the indicator will now give a reading indicative of the penetration to or dependent upon the depth of penetration of the ball 34, plus the deformation which takes place while the ball is in contact with the plate and is acted on by the weight.

The machine is allowed to remain in this condition a sufficient time to permit the material under test to assume a static condition, after which the head 19 is turned back ninety degrees, thus raising the angle member 16 with the plunger 6 and weight 15. The reading now given by the indicator is the depth to which the ball has penetrated the plate under test and this reading, when used in the well known formula for hardness, gives a number representing the hardness of the specimen. The handle 19 may now be given a further turn of ninety degrees which will raise the angle member 30 with the plunger 11 and permit the test plate to be replaced by another. By adjusting the needle valve 25, the rate of descent of the plunger 6 and weight 15 may be accurately regulated.

In that form of my invention shown in

Figure 8:
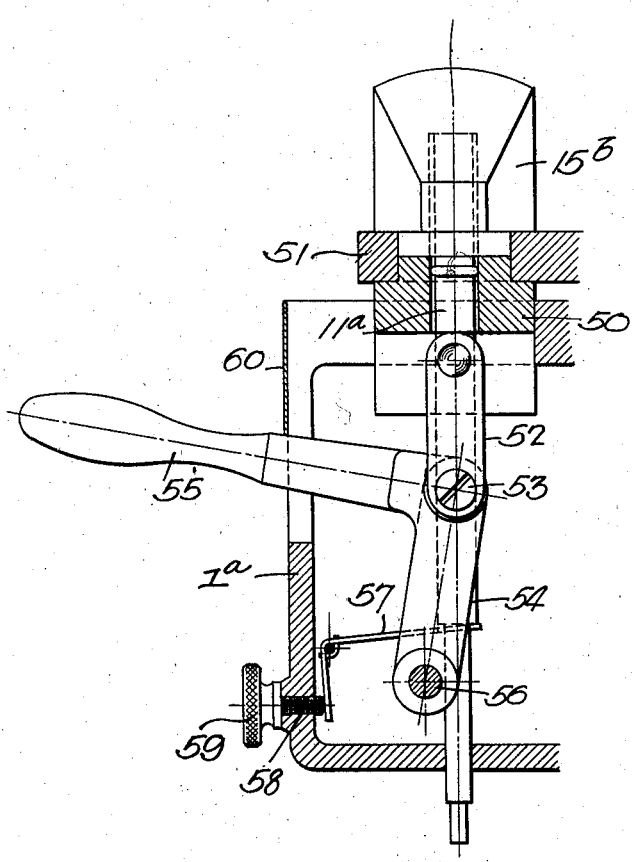
Fig. 8 is a vertical section on the line 8—8, Fig. 7.
Figure 7:
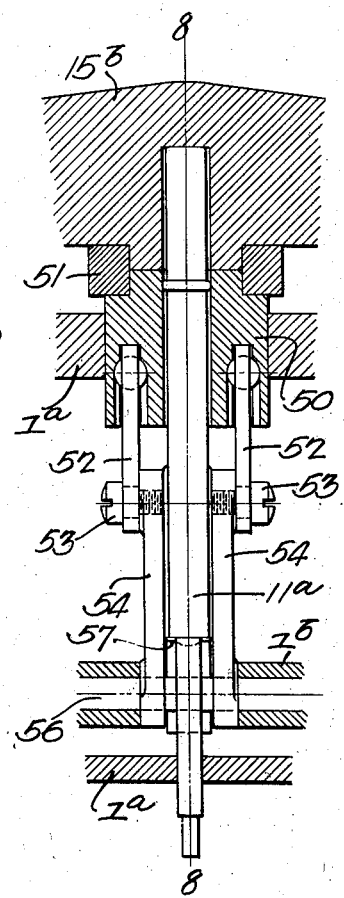
Fig. 7 is a fragmentary vertical section illustrating a modification of my invention.

Figs. 7 and 8 the main structure or frame 1ª is so formed as to provide a vertical guideway for a sleeve 50, supporting the weight 15ᵇ, for which purpose it is provided with a guide-ring 51 mounted on its upper end to slidably receive a suitably formed boss or hub on said weight. Vertically slidable in and guided by the sleeve is the plunger 11ª whose lower end, which is of reduced section, is likewise guided by a second portion of said frame and has mounted upon it the penetrating ball with the indicating apparatus as described in connection with that form of my invention shown in Figs. 1 to 6. Pivotally connected to and extending downwardly from the sleeve 50 are a pair of links 52—52 whose lower ends are respectively connected by screws 53 with a pair of links 54—54 integral with a laterally projected operating handle 55. The lower ends of these two links 54 are pivotally mounted on a pin 56 suitably carried in a supporting bearing 1ᵇ, and the two pairs of links 52 and 54 constitute a toggle whereby the sleeve 50 and the weight 15ᵇ may be raised or lowered at will.

For controlling the motion of the plunger 11ª, I pivot to a suitable portion of the frame 1ª a bell crank lever 57, preferably of spring material and so positioned that one of its arms will embrace or operatively engage a shouldered portion of the plunger 11ª. Said lever has a second arm, positioned to be engaged by a controlling screw 58, threaded into the frame 1ª and having an operating head 59.

With the above described arrangement of parts, when the handle 55 is in the position shown, the sleeve 50 and weight 15ᵇ are held in elevated positions,—the toggle elements 52 and 54 being slightly bowed out of their straight position and the handle 55 being held in movement by a cross bar 60 on the frame 1ª. If the screw 58 occupies the position shown, the bell crank lever 57 will also hold up the plunger 11ª although by backing off said screw, said plunger may be allowed to move downwardly until the ball on its lower end rests upon the plate to be tested. If, now, the handle 55 be pressed down, the sleeve 50 with the weight 15ᵇ is allowed to move downwardly so that said weight engages the upper end of the plunger 11ª and the ball on the latter is pressed into the sheet, whose hardness is determined as previously described. The weight 15ᵇ is thereafter raised by an upward movement of the handle 55 and after the reading of the indicator has been taken, the screw 58 is set up so as to raise the plunger 11ª from engagement with the test specimen.

From the above description it will be appreciated that the device is not only simple in construction but is convenient to operate, compact, portable and not likely to get out of repair. Moreover it is of such a nature that it may be accurately operated at a high speed.

I claim:

1. The combination in a hardness testing machine of an anvil for supporting a test specimen; an indenting member; a weight for actuating said indenting member; means for automatically controlling the rate at which said weight is applied; means for removing the weight from the indenting member; and means for automatically indicating the amount of penetration of the indenting member.

2. The combination in a hardness testing machine of an anvil for supporting a test specimen; an indenting member; a weight for actuating said indenting member; means for regulating the rate at which the weight is applied; means for removing the weight from the indenting member; and means carried by the indenting member for automatically indicating the amount of penetration of the indenting member after the removal of said weight.

3. The combination of a hardness testing machine of an anvil for supporting a test specimen; an indenting member; a weight for actuating said indenting member; and a dash pot operatively associated with the indenting member for regulating the rate of movement of the weight.

4. The combination in a hardness testing machine of a frame including a member for supporting a test specimen; a plunger guided by the frame; an indenting element for the plunger; a weight operative on the plunger; means for controlling the application of the weight to the plunger; and means for regulating the rate of movement of the weight upon the plunger.

5. The combination in a hardness testing machine of a frame including a member for supporting a test specimen; a plunger guided by the frame; an indenting element for the plunger; a weight operative on the plunger; means for controlling the application of the weight to the plunger; and a dash pot operatively associated with the weight for regulating its rate of movement.

6. The combination in a hardness testing machine of a frame; two cooperating plungers guided on said frame; an indenting element on one plunger; a weight operative on the other plunger; means for automatically governing the rate at which said weight operates; with a device for causing the weight carrying plunger to act on or be released from the other plunger at will.

7. The combination in a hardness testing machine of a frame; a plunger movably guided therein; a weight; two members respectively controlling the application of the plunger to a test specimen and the application of the weight to the plunger; and a hand-actuated element for controlling said members.

8. The combination in a hardness testing machine of a frame; a plunger movably guided therein; a weight; two members respectively controlling the application of the plunger to a test specimen and the application of the weight to the plunger and hand-actuated means for controlling said members; with means for automatically controlling the rate at which the weight is applied.

9. The combination in a hardness testing machine of a frame; a plunger movably guided therein; a weight; two members respectively controlling the application of the plunger to a test specimen and the application of the weight to the plunger; hand-actuated means for controlling said members; with a dash pot for controlling the rate of movement of one of the members.

10. The combination in a hardness testing machine of a frame; an indenting member movably guided by said frame; a weight for actuating said member; a hand operated spindle; with two members controlled by said spindle and respectively controlling the operation of the indenting member and the weight.

11. The combination in a hardness testing machine of a frame; an indenting member movably guided by said frame; a weight for actuating said member; a hand operated spindle; two members controlled by said spindle and respectively controlling the operation of the indenting member and the weight; with a dash pot for regulating the action of the weight.

12. The combination in a hardness testing machine of a frame; two plungers movably guided in the frame; a weight operative on one of the plungers; an indenting member for the other plunger; a controlling spindle; two cams on said spindle; and two members controlled by the cams for respectively governing the operation of the plunger.

13. The combination in a hardness testing machine of a frame; two plungers movably guided in the frame; a weight operative on one of the plungers; an indenting element for the other plunger; and members respectively controlling operation of the plungers with cams for causing successive movements of said members and of the plungers associated therewith.

14. The combination in a hardness testing machine of a frame; two plungers movably guided in the frame; a weight operative on one of the plungers; an indenting element for the other plunger; and members respectively controlling operation of the plungers; with means for automatically governing the rate at which said weight is applied.

15. The combination in a hardness testing machine of an indenting element; means for actuating said element; and a device carried by the indenting element for automatically indicating the depth of its penetration of a test specimen; with means for automatically regulating the rate at which said actuating means is applied.

16. The combination in a hardness testing machine of a plunger; an indenting element carried by the plunger; means for actuating the plunger to cause said element to indent a test specimen; means for automatically regulating the rate at which said actuating means is caused to operate; with a device carried by the plunger for automatically indicating the depth of penetration of the indenting element.

17. The combination in a hardness testing machine of a plunger; an indenting element carried by the plunger; means for actuating the plunger to cause said element to indent a test specimen; with a device carried by the plunger for automatically indicating the depth of penetration of the indenting element and comprising a lever having an arm positioned to engage the surface of a specimen adjacent the indenting element; and an indicator actuated by said lever.

18. The combination in a hardness testing machine of a plunger; an indenting element carried by the plunger; means for actuating the plunger to cause said element to indent a test specimen; a head on the plunger; an indicating instrument carried by the head; and a member also carried by the head in position to engage a test specimen adjacent the indenting element for actuating said indicating instrument.

ROBERT B. LEWIS.